No. 655,841. Patented Aug. 14, 1900.
H. B. & J. S. WATSON & T. C. BILLETOP.
FILTER.
(Application filed Nov. 8, 1899.)
(No Model.) 2 Sheets—Sheet 1.
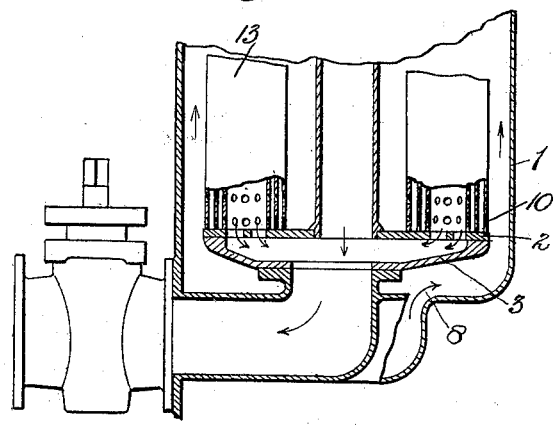
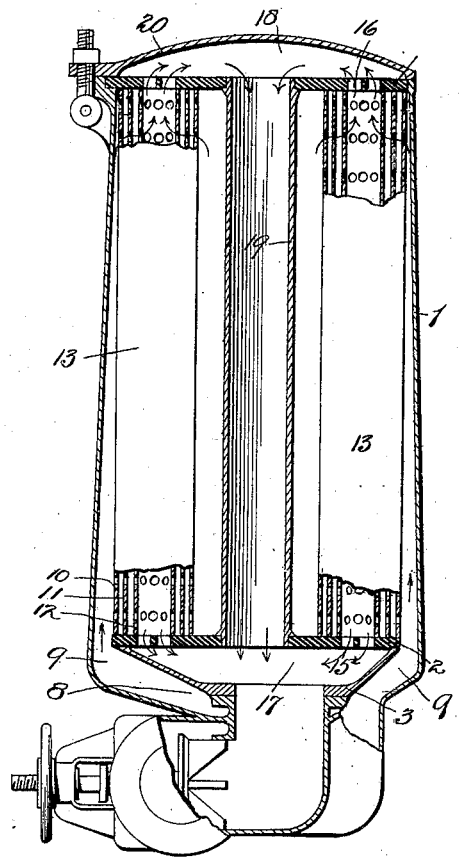
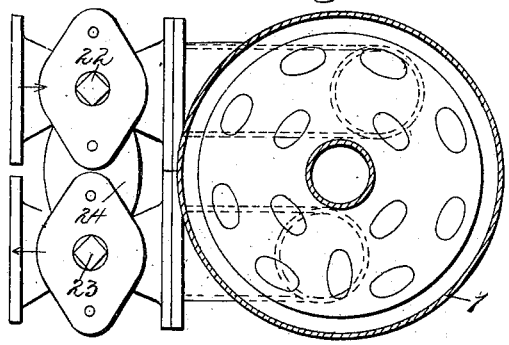
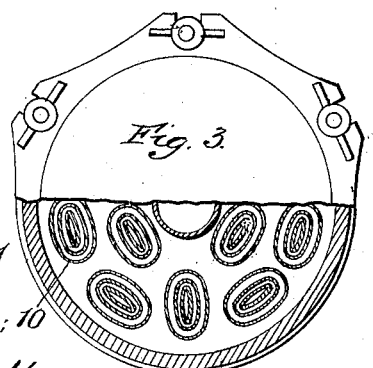
Witnesses:
Inventors
Henry Burnett Watson,
John Stanley Watson,
Torben Christian Billetop

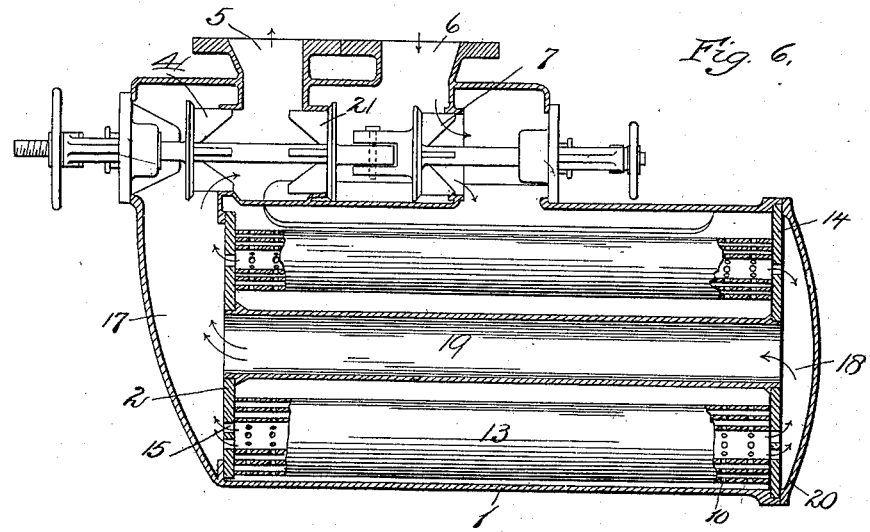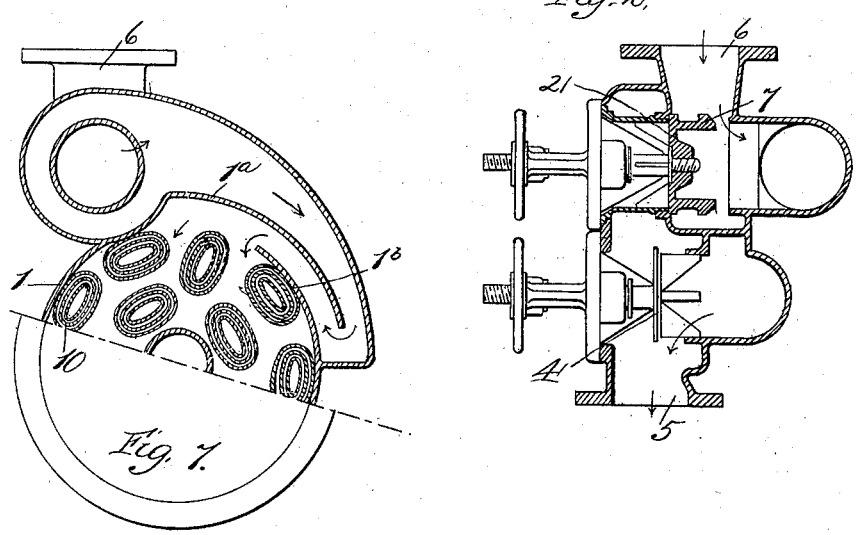

UNITED STATES PATENT OFFICE.

HENRY BURNETT WATSON, JOHN STANLEY WATSON, AND TORBEN CHRISTIAN BILLETOP, OF NEWCASTLE-UPON-TYNE, ENGLAND.

FILTER.

SPECIFICATION forming part of Letters Patent No. 655,841, dated August 14, 1900.

Application filed November 8, 1899. Serial No. 736,281. (No model.)

*To all whom it may concern:*

Be it known that we, HENRY BURNETT WATSON, JOHN STANLEY WATSON, and TORBEN CHRISTIAN BILLETOP, subjects of the Queen of Great Britain, residing in Newcastle-upon-Tyne, in the county of Northumberland, England, have invented certain new and useful Improvements in Filters, of which the following is a specification.

This invention has reference to apparatus for filtering fluids, and is especially applicable to apparatus for filtering feed-water for steam-generators and for extracting grease from exhaust-steam.

In the accompanying drawings, Figure I is an elevation, in medial section, of a feed-water filter. Fig. II is a plan in section through the valves; and Fig. III is a plan, partly in section, of the filter-case. Fig. IV is an elevation, partly in longitudinal section, and Fig. V a plan, partly in transverse section, showing the arrangement when change-cocks are fitted. Figs. VI and VII illustrate our invention applied to an exhaust-grease extractor, Fig. VI being an elevation in medial section and Fig. VII an end view partly in transverse section.

Referring in the first instance to Figs. I to III, 1 is the casing, preferably of circular cross-section, in which is fitted a bottom diaphragm 2, covering a false bottom 3, which communicates through the outlet-valve 4 with the outlet 5. The inlet 6 communicates through the inlet-valve 7 with the space 8, which through the annular opening 9 communicates with the interior of the casing 1. The casing contains a number of perforated filtering-frames 10, each of which may have inner frames 11 and 12, arranged concentrically. The filtering medium 13 is supported by and secured to the frames, and the latter are held between the bottom diaphragm 2 and an upper diaphragm 14. The interiors of the frames communicate through openings 15 and 16 in the diaphragms 2 and 14, respectively, with the spaces 17 and 18, which latter spaces are also connected together by the pipe 19, which, unlike the filtering-frames, is not perforated.

Access to the filter is obtained by means of the cover 20, which is detachably secured to the casing in any convenient manner. The valve 21, which is shown integral with the valve 7, forms a by-pass valve, by means of which, when the valves 4 and 7 are closed and the filter shut off, communication is established between the inlet and outlet.

In Figs. IV and V the control of the flow is effected in a somewhat-different manner. Two cocks—an inlet-cock 22 and an outlet-cock 23—are fitted and the passage-ways in their plugs are so arranged that in addition to forming inlet and outlet cocks they can be turned so as to by-pass the fluid from the inlet to the outlet through the communicating passage 24.

In Figs. VI and VII the valves are arranged axially instead of side by side, as in Figs. I to III, and the casing is provided with diverting or baffle plates 1ª and 1ᵇ, the inlet being in this construction arranged laterally, as shown. In other respects the filter is similar to that already described.

The action of the apparatus is as follows: Dealing first with Figs. I to III, the fluid under pressure enters by the inlet-pipe 6 and through the valve 7 to the casing 1. It then passes at a very low speed through the filtering medium 13 on the various frames to the interior of the frames. The filtered fluid from the interior of the frames is discharged at both ends thereof through the diaphragm-openings into the spaces 17 and 18, that portion which enters the upper space 18 being led back by the pipe 19 to the space 17, from which space the filtered fluid passes to the outlet.

In the filter illustrated in Figs. VI and VII, where exhaust-steam is dealt with, the special form of the inlet directs the exhaust in a zigzag path around the baffle-plates 1ª and 1ᵇ, and the greater part of the oil-coated particles impinge against the walls and drain into the casing, the grease being extracted in passing the filtering media, the remainder of the exhaust passing through the frames in the usual manner.

Although the invention has been described in reference to feed-water filters and exhaust-grease extractors, it is evident that it is with slight modifications also applicable to filters for extracting sand, mud, and other impurities and that, moreover, the frames may be so arranged as to effect either single or multiple filtration.

What we claim is—

1. The improved filter comprising a casing in which the filter-frames are supported between two diaphragms in each of which there are openings through which the interiors of the frames communicate, at the one end with a space above the top diaphragm, and at the other end with a space formed by a false bottom communicating with the outlet, the two said spaces being also in communication through a pipe such as 19; substantially as described and illustrated.

2. In a filter, in combination, the casing, the filtering-frames, the diaphragms, the false bottom connecting the openings in the lower diaphragm with the outlet, and the tube 19 connecting the openings in the upper diaphragm with the outlet, substantially as described and illustrated.

3. In combination in a filter, an outer cylinder, diaphragms arranged across opposite ends of the same, a series of filtering-cylinders extending between the diaphragms and having communication with the space between the same and the ends of the cylinder, a pipe connecting said spaces and an inlet leading into the space between the diaphragms and an outlet leading from the space between one of the diaphragms and one end of the cylinder.

4. In combination, in a filter, an outer cylinder, diaphragms arranged across opposite ends of the same, filtering-cylinders between the same, a way leading to the filtering-space, a way leading to the space between one head of the cylinder and the diaphragm extending across the same, and valves adapted to open and close communication to the respective space and to open and close communication between the respective ways independent of said spaces.

In witness whereof we have hereunto set our hands in the presence of two subscribing witnesses.

HENRY BURNETT WATSON,
    JOHN STANLEY WATSON.
    TORBEN CHRISTIAN BILLETOP.

Witnesses:
 W. H. GOLDING,
 E. YEOMAN.